Sept. 9, 1958    H. B. SEDGFIELD    2,850,905
GYROSCOPIC APPARATUS
Filed April 28, 1953    3 Sheets-Sheet 1

INVENTOR
HUGH BROUGHAM SEDGFIELD
BY
Herbert H. Thompson
his ATTORNEY.

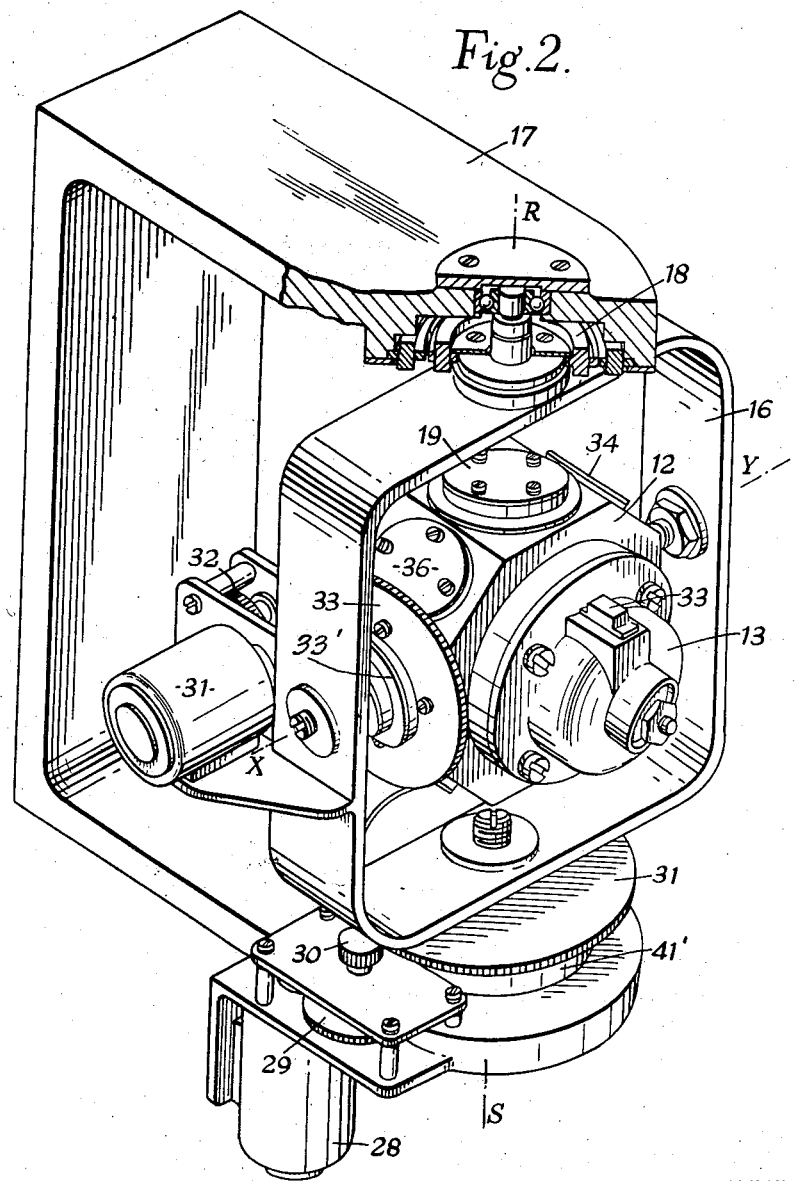

Sept. 9, 1958     H. B. SEDGFIELD     2,850,905
GYROSCOPIC APPARATUS
Filed April 28, 1953     3 Sheets-Sheet 3
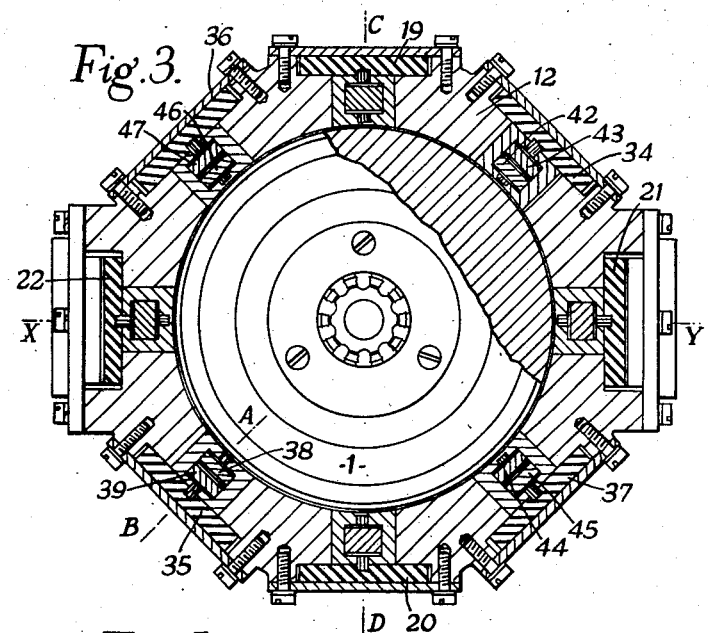
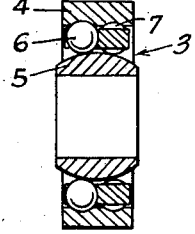
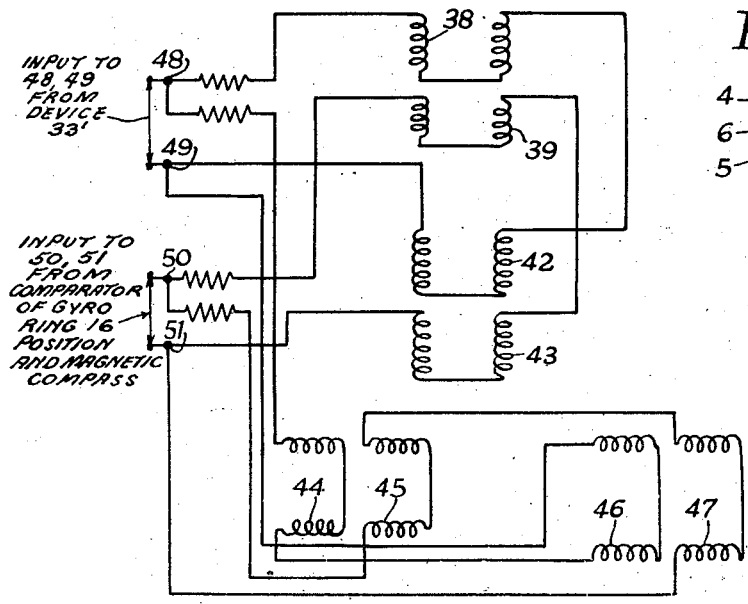
INVENTOR
HUGH BROUGHAM SEDGFIELD
BY
Herbert H. Thompson
his ATTORNEY United States Patent Office 2,850,905
Patented Sept. 9, 1958

2,850,905
GYROSCOPIC APPARATUS

Hugh Brougham Sedgfield, Hampton, England, assignor, by mesne assignments, to The Sperry Gyroscope Company, Limited, Brentford, England, a British company Application April 28, 1953, Serial No. 351,660

Claims priority, application Great Britain May 2, 1952

14 Claims. (Cl. 74—5.7)

This invention relates to gyroscopic apparatus.

In gyroscopic apparatus of the three degree of freedom type, a rotor is usually mounted for spinning in a rotor-bearing frame which is itself mounted for angular freedom of movement about at least two mutually perpendicular axes relatively to a support or housing in which the apparatus is carried. Previously in such apparatus the mounting of the rotor-bearing frame providing such freedom of angular movement has usually consisted of a gimbal frame in which the rotor-bearing frame is pivotally mounted in bearings about an axis and which is itself pivotally mounted in bearings about a perpendicular axis in the support.

It is well known to those skilled in the art that if the spin axis of the rotor in gyroscopic apparatus of the kind referred to is pointed along a predetermined set direction in space it will keep pointing along this direction in the absence of disturbing torques applied directly or indirectly to the rotor-bearing frame, causing it to process away from the preset direction. It is more or less impossible to avoid some disturbing torques and it is accordingly extremely difficult to construct gyroscopic apparatus in which the rotor will maintain its spin axis pointing in a predetermined set direction in space for any appreciable length of time.

Various factors, connected with the construction and mounting of the rotor, are responsible for the disturbing torques acting directly or indirectly on the rotor causing it to process. One of the chief factors is the fact that frictional torques act at the bearings supporting the rotor-bearing frame and gimbal frame when the relative angular movement of the rotor-bearing frame and its support or housing takes place.

In some cases it is extremely desirable to produce gyroscopic apparatus in which the rotor will maintain its spin axis directed substantially in a predetermined set direction in space for a considerable length of time. For example, it may be desirable to provide an absolute reference in space for a period of time sufficient to enable a craft to be guided over a long range. For this purpose it is essential that the disturbing torques be kept down to a minimum.

It is an object of the present invention to provide gyroscopic apparatus in which the rotor is mounted in a support in a novel manner.

In accordance with the present invention there is provided gyroscopic apparatus comprising a rotor mounted in a supporting frame for spinning about a spin axis and for angular movement of the spin axis relative to the supporting frame about any axis perpendicular to the spin axis through a limited angle from a zero position relative to the supporting frame; a main support in which the supporting frame for the rotor is mounted about two mutually perpendicular axes; servo motors for controlling the supporting frame to follow the angular movements of the rotor about the said axes under the control of pick-off means mounted on the supporting frame adjacent to the periphery of the rotor to co-operate with the periphery to detect relative angular movements of the rotor and its supporting frame; a ball bearing for the rotor comprising two sets of bearing balls adapted to run in parallel circular tracks, lying in planes normal to the spin axis, that are defined by an outer ball race located in the interior of an axial bore in the rotor, the inner race for the two sets of balls being provided by portions of concentric spherical surfaces of an inner race member supported from the supporting frame at the centre of the rotor, the two portions lying on opposite sides of the common centre of the spherical surfaces; and means for driving the rotor about its spin axis.

In view of the spinning of the rotor and the continuous rotation of the balls substantially no frictional forces will be applied to oppose relative angular motion of the rotor about an axis perpendicular to the spin axis.

Preferably the inner races for the two sets of bearing balls comprises portions of a single sphere.

An embodiment of the invention will now be described by way of example with reference to the accompanying drawings in which:

Fig. 2 is an isometric projection of the apparatus in which parts have been cut away to illustrate other parts more clearly:

Fig. 3 is a vertical section through the rotor case showing the pick-offs and torque motors:

Fig. 4 is a section illustrating more clearly the parts of the bearing support for the rotor:

Fig. 5 is a wiring diagram of the torque motor circuits.

Figure 1:
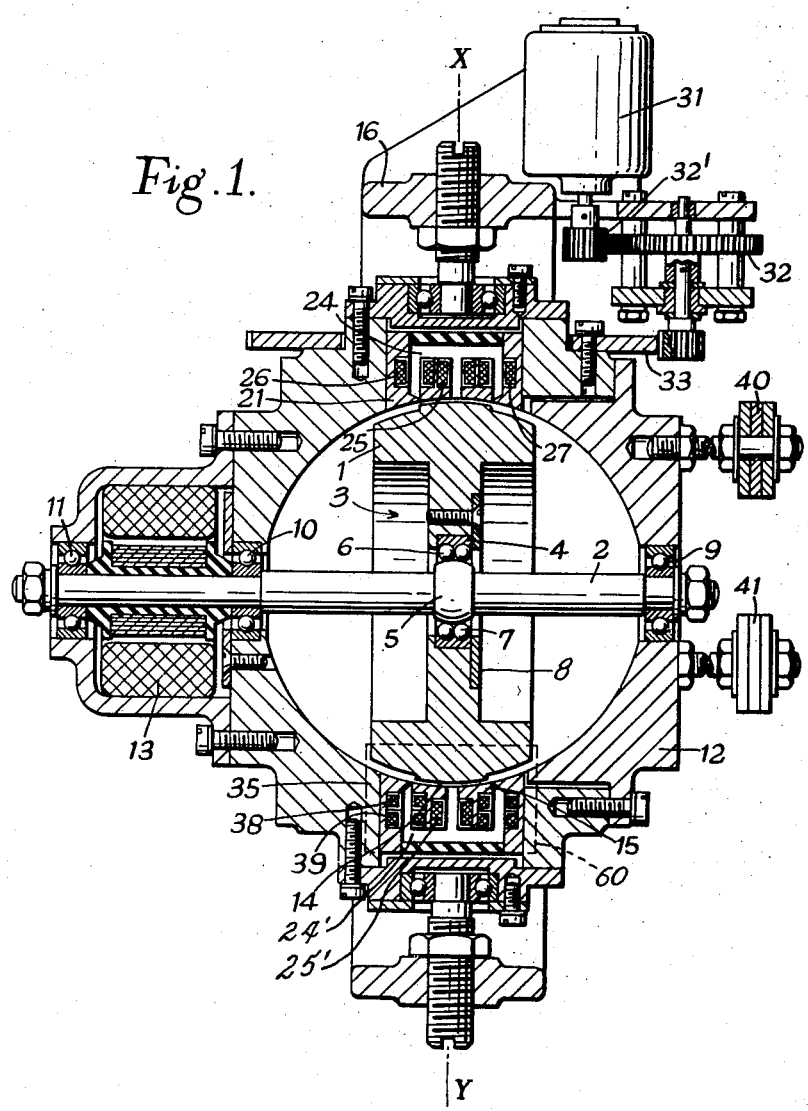
Fig. 1 is a plan view partly in section of a directional gyroscope embodying the invention, the parts inside the dotted oblong 60 therein being a section along line AB in Fig. 3.

Referring to the drawings the main feature of the gyroscopic apparatus comprises a rotor 1 mounted for rotation about its spin axis on a shaft 2 by means of a ball bearing 3. The ball bearing 3 is constructed as a compact unit capable of fitting on to the shaft 2 and comprises an outer race 4 having two parallel circular tracks perpendicular to the spin axis of the rotor, inner race 5, and two sets of bearing balls 6 and 7 which are retained in the two tracks. The inner race 5 is a hollow truncated sphere thereby permitting angular movement of the race 4 relative to the race 5 about any axis perpendicular to the spin axis through a limited angle. This angular movement takes place substantially without restriction from frictional forces when the balls 6 and 7 are in rotation. The bearing 3 is mounted on the shaft 2 by closely fitting the hollow inner race 5 on to the shaft and the rotor 1 is located on the outer race 4 by a retaining ring 8 in such a manner that the centre of the rotor 1 is at the centre of the truncated sphere 5.

The shaft 2 is mounted by means of bearings 9, 10 and 11 in a follow-up supporting frame 12 which substantially encloses the rotor 1. The shaft 2 is caused to rotate by a motor 13 mounted on the supporting frame. The rotor 1 is thus spun by the frictional forces set up in the ball bearing 3. In order to ensure that the balls 6 and 7 are continuously rotated it is necessary to retard the rotor 1 so that it is not driven in synchronism with the shaft 2. Accordingly the supporting frame 12 is filled with air or other gas so that the viscous drag caused by the film of air between the outer surface 14 of the rotor 1 and the inner surface 15 of the supporting frame 12 retards the spin of the rotor. It will be seen that the inner surface of the supporting frame is of substantially spherical construction thereby ensuring that, no matter what the position of the rotor is, the viscous forces act substantially about the spin axis of the rotor and do not apply precessional torques to the rotor. In view of the continuous rotation of the balls, the frictional forces impeding the limited movement of the rotor about axes perpendicular to the spin axis are reduced considerably.

Balancing masses 40, 41 are provided on the supporting frame to balance the weight of the motor 13.

The supporting frame 12 is pivotally mounted about a normally horizontal axis XY in a vertical ring 16 which in turn is pivotally mounted about a vertical axis RS in a main support 17. The main support 17 may be mounted in a conventional manner in an aircraft and an indicator (not shown) may be provided on the gimbal ring 16 to indicate angular movements in azimuth of the craft; alternatively or additionally, a pick-off device 41' may be provided to detect azimuth movements of the craft about the vertical axis RS to control a remote indicator or an automatic pilot. Furthermore, the apparatus may be monitored in azimuth from a device responsive to the earth's magnetic field for which purpose a selsyn device 18 is mounted about the vertical axis RS so that it may be connected to a selsyn device associated with a magnetic compass, such as a flux valve compass, to provide an error signal when there is angular deviation between the gyroscope and the magnetic compass. The error signal is utilised in a well-known manner to apply precessional torques to the gyroscope to remove the misalignment.

As has been stated, the angular movement permitted to the rotor about the axes perpendicular to the spin axis is limited and it is necessary, therefore, to provide a follow-up arrangement to cause the supporting frame to follow the angular movements of the rotor. The follow-up arrangement comprises two pairs of pick-off devices 19, 20, and 21, 22 for detecting tilt of the rotor about two mutually perpendicular axes relative to the follow-up frame 12. These pick-off devices are illustrated more clearly in Figure 3 and are disposed on the supporting frame 12 circumferentially around the periphery of the rotor. The two pick-off devices 19 and 20 of one pair are mounted on the follow-up frame on diametrically opposite sides of the rotor 1 and the pick-off devices 21, 22, of the other pair are mounted in quadrature on diametrically opposite sides of the rotor 1. As will be seen from Figure 1 pick-off device 21 is of the conventional E-type having a core of magnetic material 24 and suitably disposed windings 25, 26, 27. The pick-off device 21 illustrated in Figure 1 will provide an output signal of a magnitude and polarity dependent upon the magnitude and sense of angular displacement of the rotor 1 relative to the frame 12 about an axis perpendicular to the plane of the drawing (in the present case a vertical axis). The diametrically opposite pick-off device 22 (not shown in Figure 1) provides a similar output. These two outputs are combined to provide a signal of twice the magnitude of the output of one pick-off device and of a sense dependent on the direction of tilt. This output is applied to control a servomotor 28 mounted on the main frame 17 which is connected through reduction gearing 29, 30, 31, to drive the gimbal ring 16. The follow-up frame 12 is thus caused to align itself with the rotor 1 about the vertical axis.

The pick-off devices 19, 20 not shown in Fig. 1, serve to detect angular movements of the rotor 1 relative to the frame 12 about the axis XY (Figure 2) and to provide output signals in dependence on said angular rotation. These output signals are combined as with the other pair of pick-off devices and supplied to control a servomotor 31 (Figs. 1 and 2) mounted on the gimbal ring 16 and connected, through reduction gearing 32, 33, 32' to drive the follow-up frame 12 to follow the rotor 1 about the axis XY.

As has been stated, two pairs of pick-off devices are provided, the outputs of the two pick-off devices of each pair being combined. By this means, the outputs of the pick-off devices cancel each other out when lateral disturbances of the rotor take place under the action of acceleration forces and no "error" signal is provided as would be the case if a single pick-off device were used.

Referring to Figure 2 if the apparatus is to function as a directional gyroscope, for an appreciable length of time, it is necessary either to control the follow-up frame 12 so that the spin axis of the rotor 1 is maintained substantially horizontal, or to control the follow-up frame so that the spin axis is kept perpendicular to the vertical ring 16. In either case, it is necessary to provide a torque-applying arrangement (described hereinafter) for applying torques to the rotor about the vertical axis. In the present case the rotor axis is maintained substantially horizontal by the application of control torques about the vertical axis under the control of a gravity-responsive device 33' mounted on the follow-up frame 12. Such gravity-responsive device 33' may take any one of several well-known forms and need not be described in detail here. Suffice it to state that it provides a signal of a magnitude and sense dependent on the magnitude and sense of tilt of the follow-up frame 12 about the axis XY. It will also be appreciated that if the directional gyroscope is to be monitored in azimuth from a magnetic compass such as a flux valve compass, it will be necessary to apply torques to the rotor about the horizontal axis XY so as to cause it to precess in azimuth in dependence on a misalignment error-signal.

In order to apply torques to the rotor, the apparatus is provided with force-applying devices 34, 35, 36, 37 as shown in Fig. 3 arranged circumferentially on the frame 12 around the periphery of the rotor with a force-applying device between every two pick-off devices. Each force-applying device is constructed, as will be seen from the dotted line portion of Fig. 1, substantially similar to the pick-off devices and the two force-applying devices of each pair are adapted to impart forces in opposite directions parallel to the rotor axis to diametrically opposite portions of the rotor. Referring to the illustration within the dotted line portion of Fig. 1, it will be seen that the force-applying device comprises an E-shaped core 24' having a permanently energized winding 25' on its central arm and two sets of energizable windings 38, 39 on the outer arms. Each set of energizing windings comprises one winding wound in one sense on one outer arm of the E and a winding connected in series but wound in the opposite sense on the other outer arm of the E. When the two windings of one set are energized, the flux produced by one winding will add to, and the flux produced by the other winding will subtract from the flux produced by the central winding, thus producing a difference in the flux density in the air gap between the E-shaped core and the periphery of the rotor 1. The periphery is made of magnetic material and the difference in flux density thereby causes the application of a force to the rotor substantially parallel to the direction of the rotor axis and in the plane of the paper as shown in Fig. 1.

In view of the fact that the force-applying devices are disposed at angles of 45° to the axes CD, XY about which torques are to be produced, each force-applying device is provided with the two energizable windings referred to. These are designated as 38, 39, 42, 43, 44, 45, 46, 47. One set of windings 38, 42, 44, 46 (Fig. 5) is energized by the output of the gravity-responsive device 33' which, as has been stated, provides a control signal of a magnitude and sense dependent on the tilt of the rotor frame or casing. When energized, this set of windings causes the application of forces to the rotor frame or casing which are in the appropriate senses to apply a torque about the axis CD which normally coincides with the vertical axis RS. The other set of windings 39, 43, 45, 47 when energized, cause the application of forces to the rotor frame or casing in the appropriate sense to produce torques about the axis XY to produce precession of the rotor about the vertical axis RS. For example, a control signal defining precession required about the axis RS may be an error signal derived in well known manner from a comparison device which compares the azimuth position of the gyroscope about the vertical axis RS with the azimuth indication of a magnetic compass. As has been stated the selsyn transmitter 18 may be utilized for supplying a signal defining the angular position of the gyroscope about the axis RS to the comparison device.

Referring to Figs. 3 and 5, the windings 42 and 44 are connected in the same sense and the windings 38, 46 are connected in the same sense but in an opposite sense to the windings 42 and 44 so as to apply forces acting jointly to produce a torque about the axis CD. The windings 43, 47 are connected in the same sense and the windings 45, 39 are connected in the same sense but in an opposed sense to the windings 43, 47 so as to apply forces acting jointly to apply a torque about the axis XY.

The output of the gravity-responsive device 33' is applied as an input to the terminals 48, 49 and a signal defining precession required in azimuth about the axis CD is applied to the terminals 50, 51, which compares the position of the gyroscope with that of the magnetic compass such as a flux valve not shown. As shown, the terminals 48, 49 are connected to the windings 38, 42, 44, 46 and the terminals 50, 51 are connected to the terminals 39, 43, 45, 47.

I claim:

1. Gyroscopic apparatus comprising a rotor, a supporting frame mounting said rotor for spinning about a spin axis and for angular movement of the spin axis relative to the supporting frame about any axis perpendicular to the spin axis through a limited angle from a zero position relative to the supporting frame; a main support in which said frame is mounted about two mutually perpendicular axes; servomotors for controlling the supporting frame to follow the angular movements of the rotor about the said axes, pick-off means mounted on the supporting frame adjacent the rotor to detect relative angular movements of the rotor and its supporting frame for controlling said motors and a ball bearing for the rotor comprising two sets of bearing balls adapted to run in parallel circular tracks, lying in planes normal to the spin axis, that are defined by an outer ball race located in the interior of an axial bore in the rotor, the inner race for the two sets of balls being provided by portions of concentric spherical surfaces of an inner race member supported from the supporting frame at the centre of the rotor, the two portions lying on opposite sides of the common centre of the spherical surfaces; and means for driving the rotor about its spin axis.

2. Gyroscopic apparatus as claimed in claim 1 wherein the inner race for the two sets of bearing balls comprise portions of a single sphere.

3. Gyroscopic apparatus as claimed in claim 1 wherein the member whose surfaces form the inner race is supported by the supporting frame by being fixed or formed on a shaft mounted in bearings in the supporting frame for rotation relative thereto about an axis defined in the supporting frame corresponding to the zero position of the spin axis of the rotor, and means for rotating the shaft about its axis whereby the frictional forces set up in the ball bearing when the shaft is rotating may serve as the means for spinning the rotor.

4. Gyroscopic apparatus as claimed in claim 3 wherein the rotor is subject to braking torques whereby, even in a steady state of motion, there is relative rotation between the outer and inner races of the ball bearing.

5. Gyroscopic apparatus as claimed in claim 4 wherein the supporting frame contains a gas or air and it and the rotor are so constructed and arranged symmetrically relative to each other that viscous forces due to the viscous drag of the gas or air acting during the rotation of the rotor act substantially only about the spin axis of the rotor to brake the rotor thereby causing substantially no precessional torques to be applied to the rotor.

6. Gyroscopic apparatus as claimed in claim 1 wherein the rotor is enclosed in a cavity in the supporting frame which cavity has the form of a sphere concentric with the centre of the spherical surfaces of the inner race of the ball bearing.

7. Gyroscopic apparatus as claimed in claim 1 wherein the pick-off means comprises two pairs of pick-off devices, one pair for each axis, the pick-off devices of each pair being arranged substantially diametrically opposite to each other with respect to the spin axis of the rotor in positions in the vicinity of the periphery of the rotor and connected to provide a combined output on tilt of the rotor, the connections being such that relative lateral displacement of the rotor and frame produce along the rotor axis no resultant output signal in the pick-off.

8. Gyroscopic apparatus as claimed in claim 1 including torque-applying means comprising two force-applying devices mounted on the supporting frame and angularly spaced by 90° about the rotor axis in the vicinity of the periphery of the rotor and acting, when energized, to apply forces to the rotor in directions substantially parallel to the rotor axis at points on the periphery of the rotor angularly spaced by 90° about the rotor axis, the force-applying devices being energized in similar senses for producing a torque about one axis and in opposite senses for producing a torque about a perpendicular axis.

9. Gyroscopic apparatus as claimed in claim 8 wherein said torque-applying means comprises two further force-applying devices located on the supporting frame at positions in the vicinity of the periphery of the rotor that are diametrically opposed to the locations of the first-mentioned force-applying devices, each additional force-applying device being energized in a sense opposed to the sense in which its diametrically opposite force-applying device is energized whereby it serves to aid said last-mentioned force-applying device.

10. Gyroscopic apparatus as claimed in claim 1 wherein said pick-off means comprises two pair of pick-off devices arranged on said supporting frame in equidistantly spaced circumferential relation around the periphery of the rotor.

11. Gyroscopic apparatus as claimed in claim 1 including means mounted on the supporting frame for applying a torque to the rotor, and wherein the rotor axis is maintained horizontal by a gravity-responsive device mounted on the supporting frame so as to detect tilt of the frame and provide a control signal for operating said torque applying means to remove the tilt.

12. In a gyroscopic apparatus, a spherical rotor, a casing universally supporting and enclosing the rotor without gimbals, a pair of pick-off means located in said casing around the equator of said rotor, one responsive to relative tilt of said rotor and casing around one axis and the other to relative displacement in azimuth of said rotor and casing, a follow-up motor for positioning said casing about said first axis responsive to said first pick-offs, a follow-up motor for positioning the casing in azimuth responsive to said other pick-off, gravity-responsive means for detecting tilt of the rotor and casing about a horizontal support axis, and torque applying means also positioned in said casing about the equator of said rotor and controlled by said detecting means for erecting the rotor and casing in relation to the horizontal support axis.

13. In a gyroscopic apparatus, a spherical rotor, a casing universally supporting and enclosing the rotor without gimbals, a pair of pick-off means located in said casing around the equator of said rotor, one responsive to relative tilt of said rotor and casing around one axis and the other to relative displacement in azimuth of said rotor and casing, a follow-up motor for positioning said casing about said first axis responsive to said first pick-offs, a follow-up motor for positioning the casing in azimuth responsive to said other pick-off, torquers also located in said casing around the equator of said rotor between said pick-offs for exerted torques on the rotor about at least one selected axis, and means for supplying signals to said torquers to correct the position of the rotor and casing about said axis.

14. In a gyroscopic apparatus, a spherical rotor, a casing therefor, a central shaft in said casing on which said rotor is universally journalled, means for spinning said shaft and through it the rotor, a pair of pick-off means located in said casing around the equator of said rotor, one responsive to relative tilt of said rotor and casing around one axis and the other to relative displacement in azimuth of said rotor and casing, a follow-up motor for positioning said casing about said first axis responsive to said first pick-offs, a follow-up motor for positioning the casing in azimuth responsive to said other pick-off, gravity-responsive means for detecting tilt of the rotor and casing about a horizontal support axis, and torque applying means also positioned in said casing about the equator of said rotor and controlled by said detecting means for erecting the rotor and casing in relation to the horizontal support axis.

References Cited in the file of this patent

UNITED STATES PATENTS

| | | |
|---|---|---|
| 1,890,831 | Smyth | Dec. 13, 1932 |
| 1,954,998 | Hoffmann | Apr. 17, 1934 |
| 1,986,807 | Gillmor | Jan. 8, 1935 |
| 1,987,483 | McDonald | Jan. 8, 1935 |
| 2,440,713 | Brown | May 4, 1948 |
| 2,452,335 | Stoner | Oct. 26, 1948 |

FOREIGN PATENTS

| | | |
|---|---|---|
| 636,829 | France | Jan. 16, 1928 |